United States Patent
Okada

(10) Patent No.: US 9,516,219 B2
(45) Date of Patent: Dec. 6, 2016

(54) CAMERA SYSTEM AND SWITCHING DEVICE

(71) Applicant: Panasonic Corporation, Osaka (JP)

(72) Inventor: Takanori Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 14/186,182

(22) Filed: Feb. 21, 2014

(65) Prior Publication Data

US 2014/0253741 A1  Sep. 11, 2014

(30) Foreign Application Priority Data

Mar. 8, 2013  (JP) .................................. 2013-046307

(51) Int. Cl.
| | |
|---|---|
| *H04N 5/265* | (2006.01) |
| *H04N 5/232* | (2006.01) |
| *H04N 5/247* | (2006.01) |
| *H04N 7/18* | (2006.01) |

(52) U.S. Cl.
CPC ...... *H04N 5/23222* (2013.01); *H04N 5/23203* (2013.01); *H04N 5/23206* (2013.01); *H04N 5/247* (2013.01); *H04N 5/265* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 2002/0056122 A1 | 5/2002 | Yokoyama et al. | |
| 2007/0019943 A1* | 1/2007 | Sueyoshi | G03B 15/00 396/287 |
| 2011/0252265 A1* | 10/2011 | Iwami | H04N 19/645 713/401 |
| 2011/0304739 A1 | 12/2011 | Itakura | |
| 2012/0051712 A1* | 3/2012 | Furumoto | H04N 5/2356 386/224 |
| 2013/0021530 A1 | 1/2013 | Takahashi | |
| 2013/0063659 A1 | 3/2013 | Takahashi | |
| 2013/0232536 A1 | 9/2013 | Hirano et al. | |

FOREIGN PATENT DOCUMENTS

| | | |
|---|---|---|
| JP | 2000-183966 A | 6/2000 |
| JP | 2001-245281 A | 9/2001 |

(Continued)

*Primary Examiner* — Eileen Adams
(74) *Attorney, Agent, or Firm* — Renner, Otto, Boisselle & Sklar, LLP

(57) ABSTRACT

A camera system includes a plurality of camera devices and a switching device. The switching device transmits a reference signal to the camera devices via a network. Each of the camera devices transmits a video signal based on the time when the camera device receives the reference signal. The switching device determines one or more priority images for transmitting video signals with priority, in accordance with operation by a user. The camera system has a configuration in which transmission of a video signal from each of one or more of the camera devices not capturing the one or more priority images is delayed relative to transmission of a video signal from each of one or more of the camera devices capturing the one or more priority images.

9 Claims, 10 Drawing Sheets

(56) References Cited

FOREIGN PATENT DOCUMENTS

| | | |
|---|---|---|
| JP | 2003-204544 A | 7/2003 |
| JP | 2011-259365 A | 12/2011 |
| JP | 2013-26787 A | 2/2013 |
| JP | 2013-58986 A | 3/2013 |
| JP | 2003-304413 A | 10/2013 |
| JP | 2013-207706 A | 10/2013 |
| JP | 2003-046994 A | 2/2014 |
| WO | WO 2012/081170 A1 | 6/2012 |

* cited by examiner

CAMERA SYSTEM AND SWITCHING DEVICE

CROSS-REFERENCE TO RELATED APPLICATION

This application claims priority to Japanese Patent Application No. 2013-046307 filed on Mar. 8, 2013, the entire disclosure of which is incorporated by reference herein.

BACKGROUND

The present disclosure relates to camera systems using camera devices with network functions.

An example existing device transmits images captured by multiple cameras via a network and selects a desired image from the images.

Japanese Unexamined Patent Publication No. 2011-259365 describes, for example, a configuration including a plurality of camera devices that output video signals as packets and a relay device that relays video signals from the camera devices and selects and outputs a desired image from a plurality of images.

SUMMARY

The present disclosure provides a camera system that can reduce quality degradation of a necessary image even in a case where a network bandwidth is insufficient for video signal transmission.

An example camera system according to the present disclosure includes: a plurality of camera devices connectable to a network; and a switching device configured to transmit a reference signal for synchronizing video signals to the camera devices via the network and receive video signals from the camera devices, wherein each of the camera devices transmits the video signal based on a time when the camera device receives the reference signal, the switching device determines, in accordance with operation by a user, one or more priority images for transmitting video signals with priority among a plurality of images captured by the camera devices, and the camera system has a configuration in which a time of transmitting a video signal from each of one or more of the camera devices not capturing the one or more priority images is delayed relative to a time of transmitting a video signal from each of one or more of the camera devices capturing the one or more priority images.

A camera system according to the present disclosure is useful for reducing quality degradation of a necessary image even in a case where a network bandwidth is insufficient for video signal transmission.

DETAILED DESCRIPTION

Figure 1:
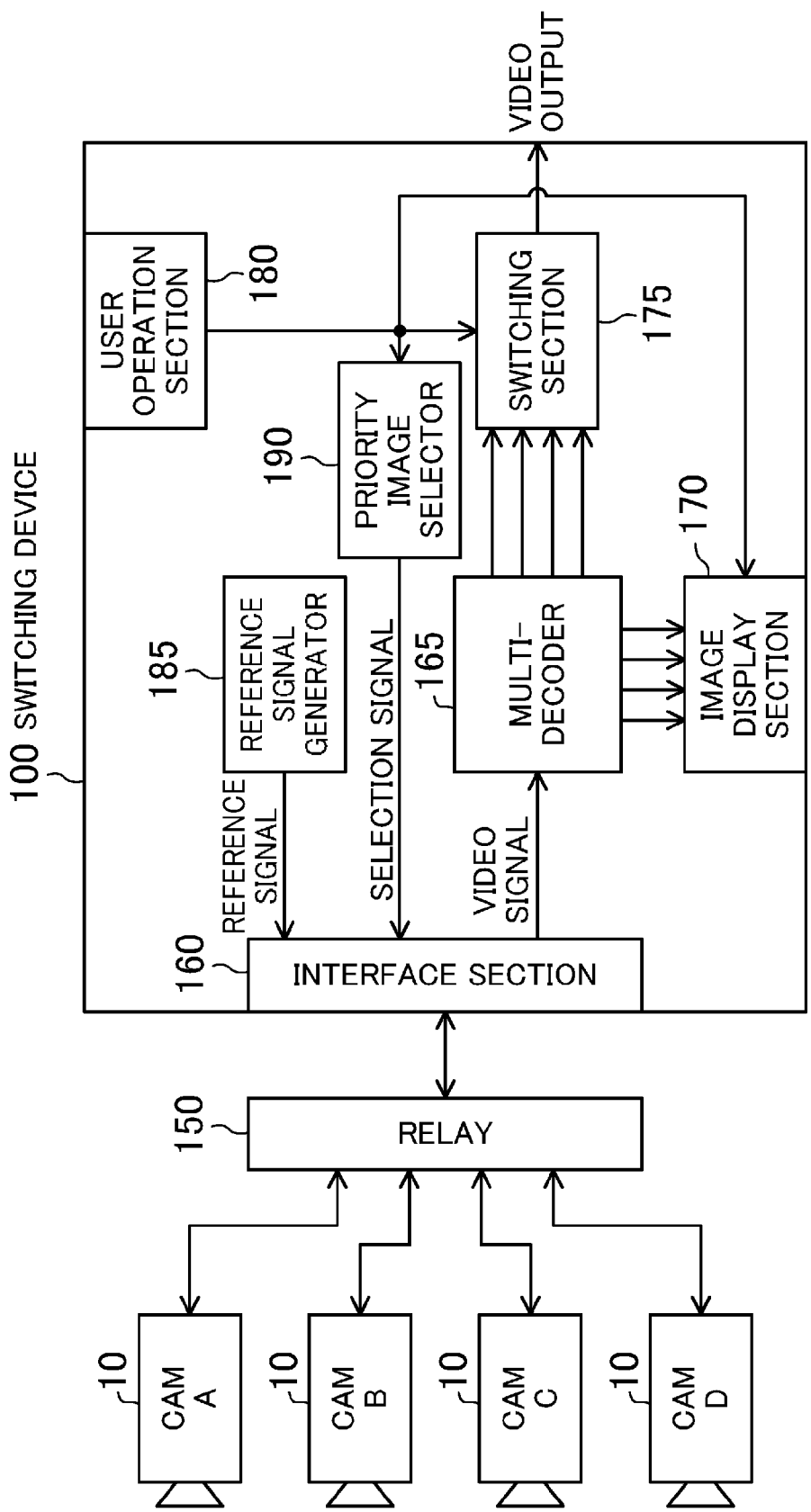
FIG. 1 is a block diagram illustrating a configuration of a camera system according to a first embodiment.

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

In an existing camera system, each camera device is connected to a switching device with a cable, and an analog video signal is transmitted through the cable. Thus, to use the camera system for broadcasting live concerts or sports, a large number of cables need to be extended inside and outside a venue for preparation of the camera system.

On the other hand, digitization of camera devices has proceeded in recent years, and a configuration in which a digital video signal subjected to compression coding is transmitted from a camera device to a switching device that decodes the video signal, has become a mainstream. In this configuration, each camera device is connected to a network, and the switching device receives a video signal via the network. In this case, the switching device only needs to be connected to, for example, a LAN cable. This configuration eliminates the necessity of extending a large number of cables, so that the camera system can be easily installed, and a cost for the system is significantly reduced.

In this configuration, however, a network bandwidth is not always sufficient for video signal transmission, which causes a possibility of quality degradation of a video signal. Specifically, in this camera system, a plurality of camera devices transmit video signals as packets in synchronization, and thus, a large number of packets are transmitted at the same time. Accordingly, a collision or a loss of packets often occurs. Consequently, packets need to be transmitted again, and a video signal is transmitted with a large delay. In particular, in a case where image data has a high bit rate or a case where a large number of camera devices are used, a large amount of packets are transmitted at the same time within a limited bandwidth of a network, and thus, the above-described phenomenon frequently occurs.

The number of cameras for use in a camera system and the resolution of cameras are expected to increase in future, and the amount of data of a video signal transmitted via a network is also expected to increase. Although the network bandwidth is, of course, also expected to increase technically, the above-described phenomenon occurs due to a correlation between the network bandwidth and the data amount of a video signal, and thus, measures against the phenomenon is still important in future.

A camera system according to the present disclosure can reduce quality degradation of an important image, such as an image output from a switching device, even in a case where a network bandwidth is insufficient for video signal transmission.

(First Embodiment)

A first embodiment will be described with reference to FIGS. 1-5.

[1-1. Configuration]

FIG. 1 is a block diagram schematically illustrating a configuration of a camera system according to the first embodiment. The camera system illustrated in FIG. 1 includes a plurality of camera devices 10 (a camera A, a camera B, a camera C, and a camera D), a relay 150, and a switching device 100. The camera devices 10 are cameras connectable to a network, i.e., network cameras, and are connected to the relay 150 via the network. The switching device 100 is connected to the relay 150 via the network. In this embodiment, the network is an Ethernet (registered trademark). That the term "connected" or "connectable," as used herein, is defined as directly or indirectly coupled in an electrical manner.

The camera devices 10 packetize captured video signals into packets, and output the packets to the network. The image data may be data subjected to compression coding or uncompressed data. The relay 150 is a network device such as a switching hub, and a network can be constituted by connecting a plurality of network devices. A video signal from each of the camera devices 10 is transmitted to the switching device 100 from the relay 150 via the network.

The switching device 100 includes an interface section 160, a multi-decoder 165, an image display section 170, a switching section 175, a user operation section 180, a reference signal generator 185, and a priority image selector 190.

The interface section 160 serves as an interface with the network, and receives video signals, audio signals, control signals, and other signals from the camera devices 10 via the network. The received video signals are transmitted to the multi-decoder 165. The interface section 160 transmits signals such as a reference signal from the reference signal generator 185 and a selection signal from the priority image selector 190 via the network.

The multi-decoder 165 includes buffers (not shown) individually provided for the camera devices 10, and temporarily stores transmitted video signals in the buffers. When a predetermined data amount or a predetermined image data unit is accumulated in one of the buffers, the multi-decoder 165 performs a decoding process. This decoding process is associated with an encoding process in the camera devices 10, and can be performed in parallel on the buffers. The image data to which the decoding process has been completed is transmitted to the image display section 170 and the switching section 175.

Figure 2:
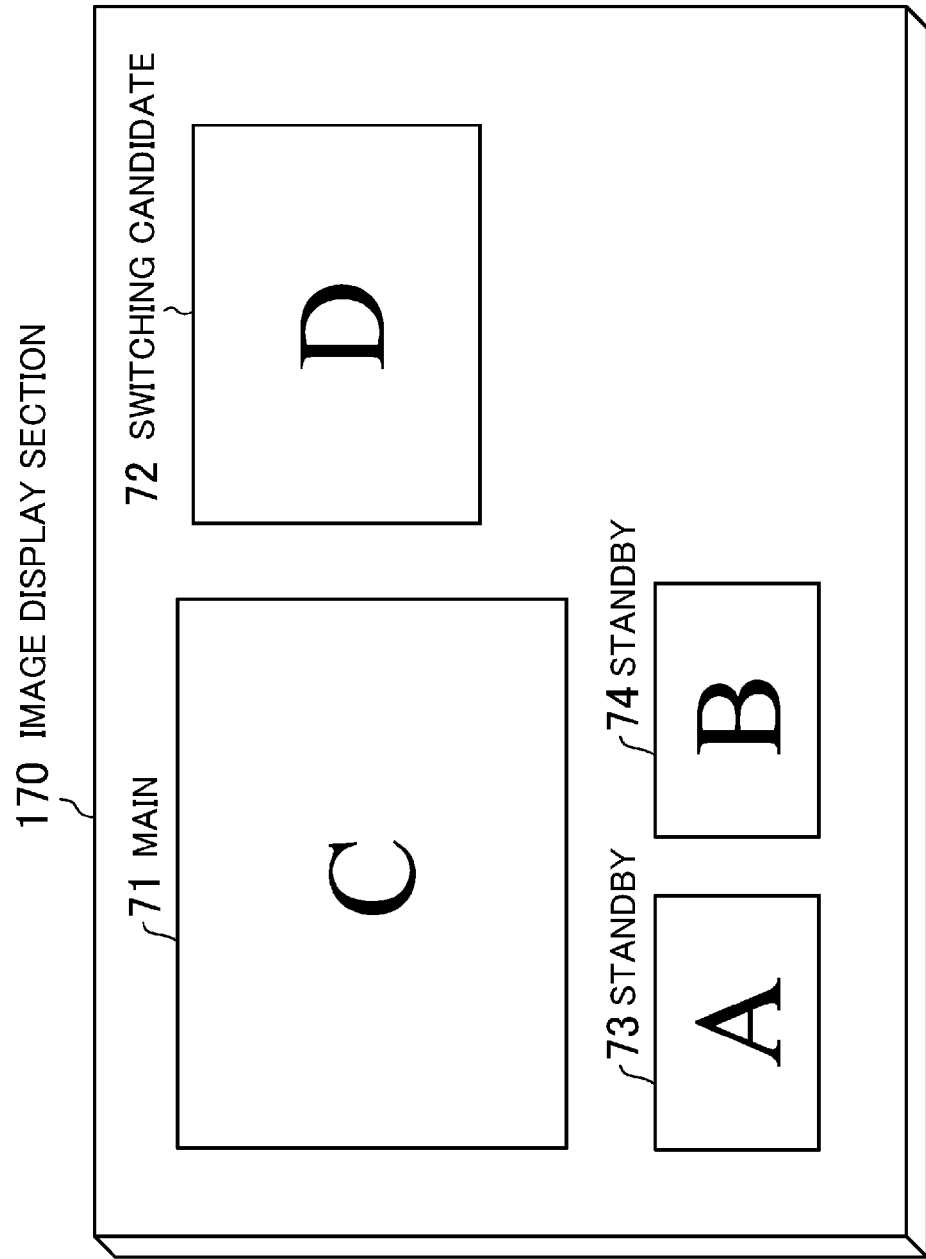
FIG. 2 illustrates an example of a screen of an image display section.

The image display section 170 displays the transmitted image data on a screen. FIG. 2 illustrates an example of the screen of the image display section 170. In the example of FIG. 2, the image display section 170 has four screens 71, 72, 73, and 74. The screen 71 displays a main image to be output from the switching device 100 to the outside. The screen 72 displays a switching candidate image to be next switched to a main image. The screens 73 and 74 display standby images. In FIG. 2, the screens 71, 72, 73, and 74 display images of the camera C, the camera D, the camera A, and the camera B, respectively.

The switching section 175 selects one of images decoded by the multi-decoder 165, based on a switching instruction output from the user operation section 180. The selected image is output as an image output of the switching device 100. In general, a main image is selected as an image to be output to the outside.

The user operation section 180 allows the user to perform image selecting operation and switching operation. Although not shown in FIG. 1, the user operation section 180 includes a user interface including buttons and switches. An output of the user operation section 180 is sent to the image display section 170, the switching section 175, and the priority image selector 190. The user can operate the user operation section 180 and switch the image between a main image and a switching candidate image at a desired timing, while watching the screen of the image display section 170. The user can also select one of a plurality of standby images so as to replace the selected standby image with the switching candidate image.

In FIG. 2, images displayed on the screens 71, 72, 73, and 74 can be switched by operation with the user operation section 180. The main image displayed on the screen 71 is output from the switching device 100 and is used for, for example, broadcasting and recording. The switching candidate image displayed on the screen 72 can be switched to the main image by operation with the user operation section 180. The user can switch the switching candidate image on the screen 72 to the main image at a desired timing, while watching the screens 71 and 72. As a result, in FIG. 2, the image on the screen 71 is switched to the image of camera D, and the image of the camera D is output as a main image from the switching device 100.

The user can also select a desired image as an image of a switching candidate from standby images on the screens 73 and 74. Operation with the user operation section 180 can replace the switching candidate image displayed on the screen 72 with the standby images displayed on the screens 73 and 74. A standby image becomes a switching candidate image through operation by the user, and the switching candidate image replaces the main image and is output by further operation by the user.

The reference signal generator 185 periodically generates a reference signal serving as a basis of the time of transmitting a video signal. This reference signal is a signal for synchronizing video signals from the camera devices 10. The reference signal is transmitted from the interface section 160 to the camera devices 10 via the network. Examples of the reference signal include a frame signal, a field signal, a line signal of an image, and a timing signal for a fixed period. Each of the camera devices 10 that have received the reference signal via the network outputs a video signal to the network based on the time when the camera device 10 received the reference signal. Thus, images of the camera devices 10 are synchronized, and the images can be easily switched by the switching device 100.

The priority image selector 190 receives an output of the user operation section 180, and generates selection signals notifying the camera devices 10 whether images being captured are priority images or not. Here, the priority images are images that are important and have priority in transmitting video signals among images captured by the camera devices 10. The selection signals are transmitted from the interface section 160 to the camera devices 10 via the network. The selection signals notify each of the camera devices 10 whether the image that is currently being captured is a priority image or not.

In this embodiment, the priority image selector 190 determines the main image and the switching candidate image as priority images. In the example of FIG. 2, for example, images that are being captured by the cameras C and D are determined as the priority images. The selection signals may be in various forms. For example, different signal values may be sent to a camera device capturing a priority image and a camera device not capturing a priority image. Alternatively, a specific signal may be sent only to camera devices not capturing priority images. Signals may also be sent at various timings. For example, a selection signal may be periodically transmitted at the same time as the reference signal, or may be transmitted only when priority images are switched.

In this embodiment, each of the camera devices 10 is configured to change the time of transmitting a video signal depending on whether an image that is being captured by the camera device 10 is a priority image or not. Specifically, when being notified that an image that is being captured is not a priority image, each of the camera devices 10 sets a period from reception of a reference signal to start of transmission of a video signal longer than that when being notified that the image that is being captured is a priority image. That is, each of the camera devices 10 is configured to delay the time of transmitting a video signal when the image that is being captured is not a priority image.

[1-2. Operation]

Figure 3:
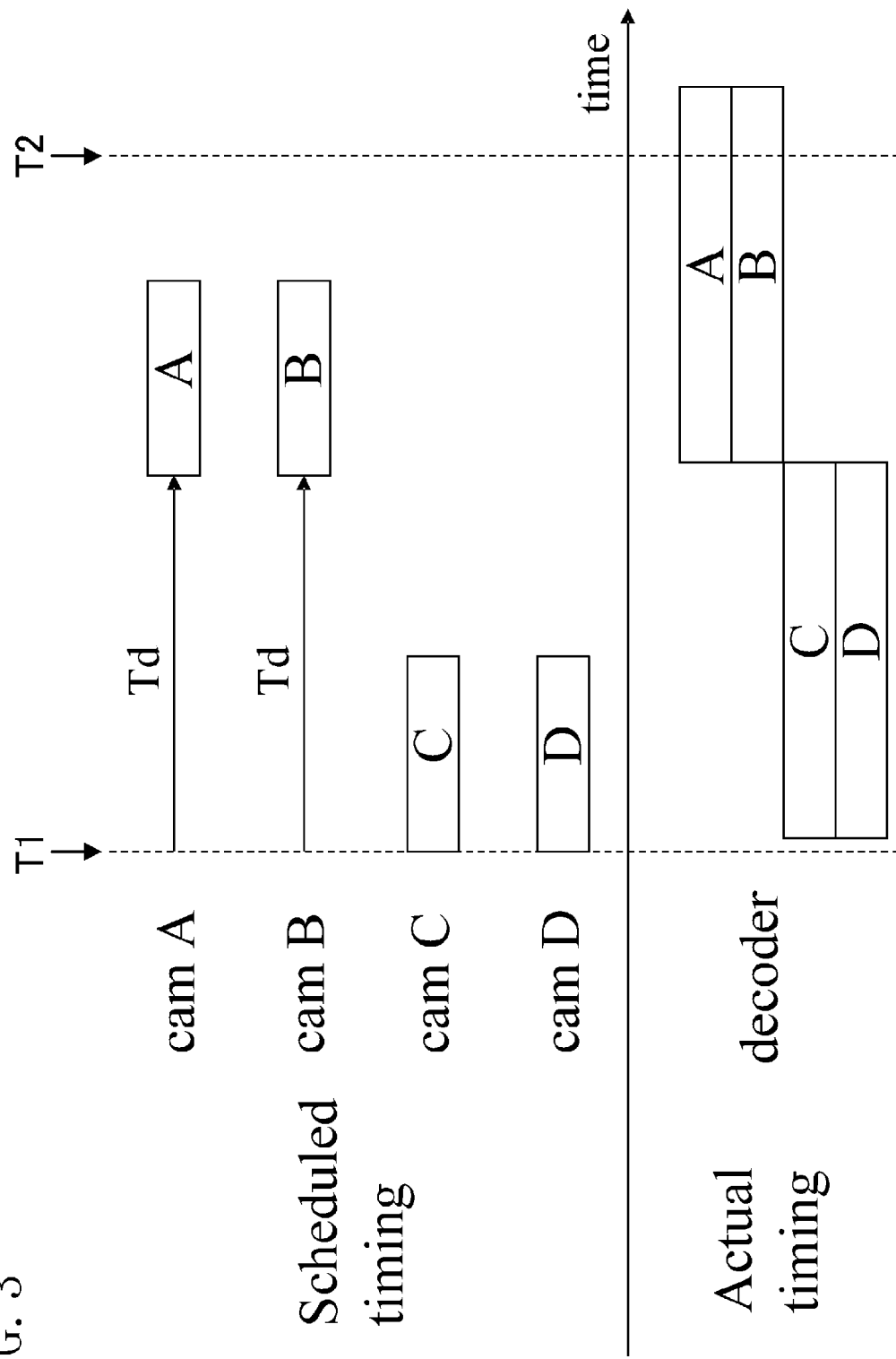
FIG. 3 is a timing chart showing an example of operation of the camera system of the first embodiment.

FIG. 3 is a timing chart showing an example of operation of the camera system of the first embodiment. The example of FIG. 3 is based on the assumption that the camera C is capturing a main image, the camera D is capturing a switching candidate image, and the image being captured by the cameras C and D are determined as priority images. In addition, it is assumed that each of the camera devices 10 (the cameras A-D) delays transmission of a video signals by a predetermined time Td when an image being captured is not a priority image. In FIG. 3, T1 and T2 denote times of receiving reference signals. In FIG. 3, the upper part ("Scheduled timing") shows scheduled times necessary for transmitting video signals, and the lower part ("Actual timing") shows times elapsed for actual transmission.

Each of the cameras A-D needs to output a predetermined unit of video signals to the network and transmit the predetermined unit to a receiver device, within a period from time T1 of receiving a reference signal to time T2 of receiving a next reference signal. Here, in a case where the network bandwidth is sufficiently large for the sum of the image bit rates of the cameras A-D, no significant problems occur even when the cameras A-D transmit video signals at the same time.

On the other hand, in a case where the network bandwidth is insufficient for the sum of the image bit rates of the cameras A-D, if the cameras A-D try to output video signals to the network at the same time, a large number of packets are transmitted at the same time, and consequently, a collision or a loss of the packets readily occur. As a result, packets need to be transferred again, and a large delay occurs in transmission of video signals. Insufficiency of the network bandwidth arises when a high-quality camera having a high image bit rate is used, when a larger number of cameras are connected, or when the network bandwidth is originally small, and so on.

To cope with this insufficiency, as illustrated in FIG. 3, the cameras A and B notified that images being captured are not priority images delay transmission of video signals by a predetermined time Td. That is, video signals only of the cameras C and D capturing priority images are output to the network at time T1 of receiving the reference signal.

In this manner, as illustrated in FIG. 3, the video signals of the cameras C and D are transmitted to the receiver device within a period before time T2. Thus, no image disturbance occurs in the main image and the switching candidate image. On the other hand, transmission of video signals of the cameras A and B is delayed by the predetermined time Td, and thus, transmission is not completed before time T2 of receiving the next reference signal in some cases, as illustrated in FIG. 3. In this case, although image disturbance occurs, this image disturbance has a small influence because the images of the cameras A and B are standby images. As a result, it is possible to avoid the problem that transmission of a priority image, i.e., an important video signal, is not completed within a predetermined period because of a network delay due to, for example, a packet collision.

The predetermined time Td may be a fixed value such as ½ or ⅓ of the period of a reference signal. The switching device 100 may adjust the value of the predetermined time Td in accordance with a network bandwidth, the number of cameras, or a parameter such as an image bit rate. Alternatively, the switching device 100 may be configured such that the predetermined time Td can be adjusted by user operation. In this case, the switching device 100 may be configured such that the user can finely adjust the predetermined time Td by using the user operation section 180 while checking the image quality. In addition, the predetermined time Td does not need to be the same among the camera devices 10, and may differ from one another among the camera devices 10.

Figure 4:
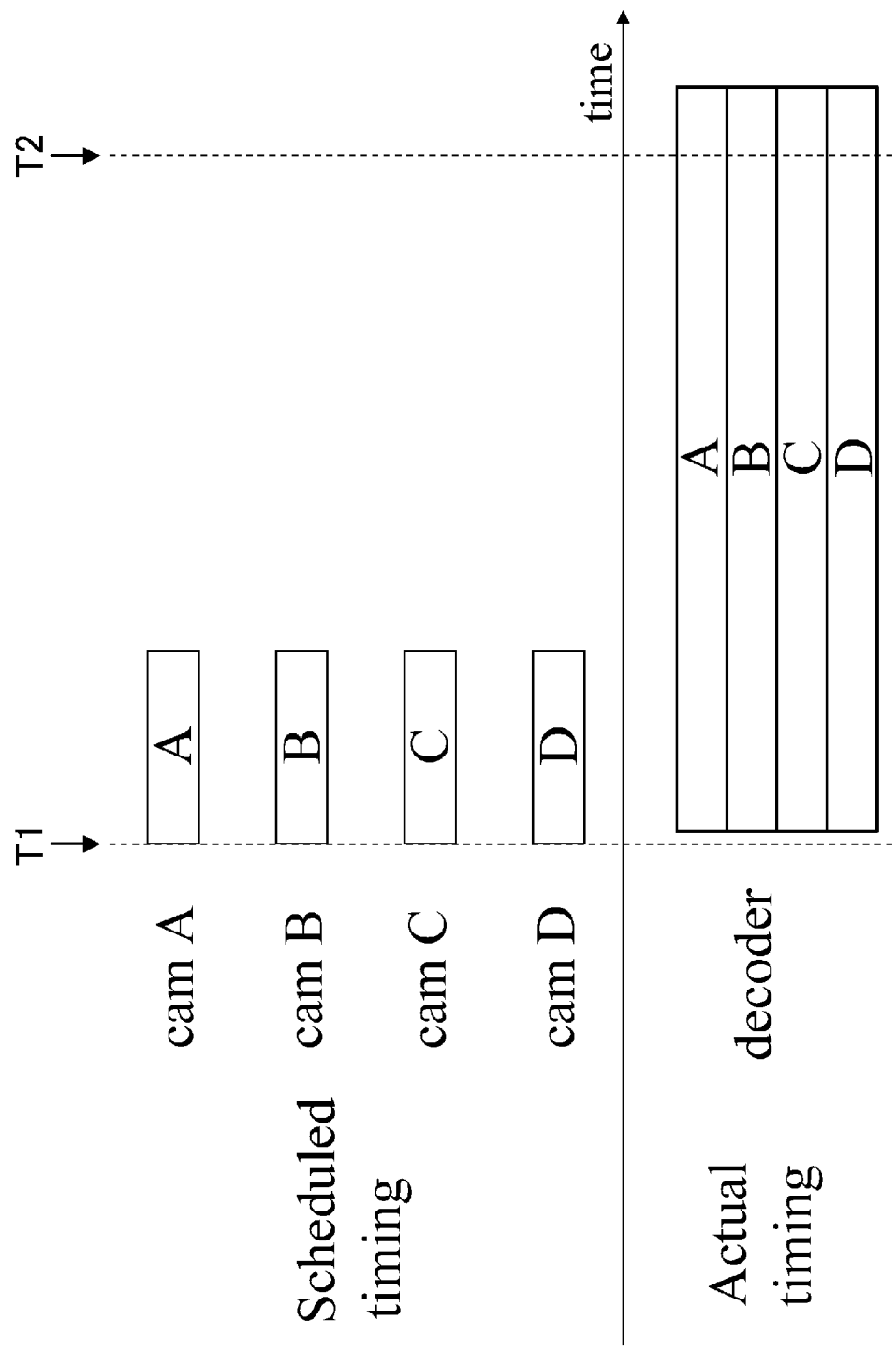
FIG. 4 is a timing chart showing an example of operation of a comparative example.

FIG. 4 is a timing chart showing an example of operation of a comparative example. In the example of FIG. 4, the cameras A-D output video signals to the network at the same time in synchronization with a reference signal. Thus, a large number of packets are output to the network at the same time, and due to constraints on the network bandwidth, retransmission of packets resulting from a loss or a collision of packets, for example, is repeated. As a result, transmission of video signals takes a time several-fold that in the scheduled timing. In this comparative example, each of the cameras A-D fails to transmit predetermined units of video signals to a receiver device until time T2 of receiving the next reference signal. Accordingly, all the images fail to be transmitted in synchronization with the reference signal, and image disturbance also occurs in a main image and a switching candidate image.

On the other hand, in the operation example of FIG. 3, the cameras A and B that are not capturing priority images delay transmission of video signals by the predetermined time Td. Thus, the cameras C and D that are capturing priority images complete transmission of video signals within a period shorter than that in the comparative example illustrated in FIG. 4. As a result, no image disturbance occurs in a main image and a switching candidate image, and high quality of the images can be maintained.

Figure 5:
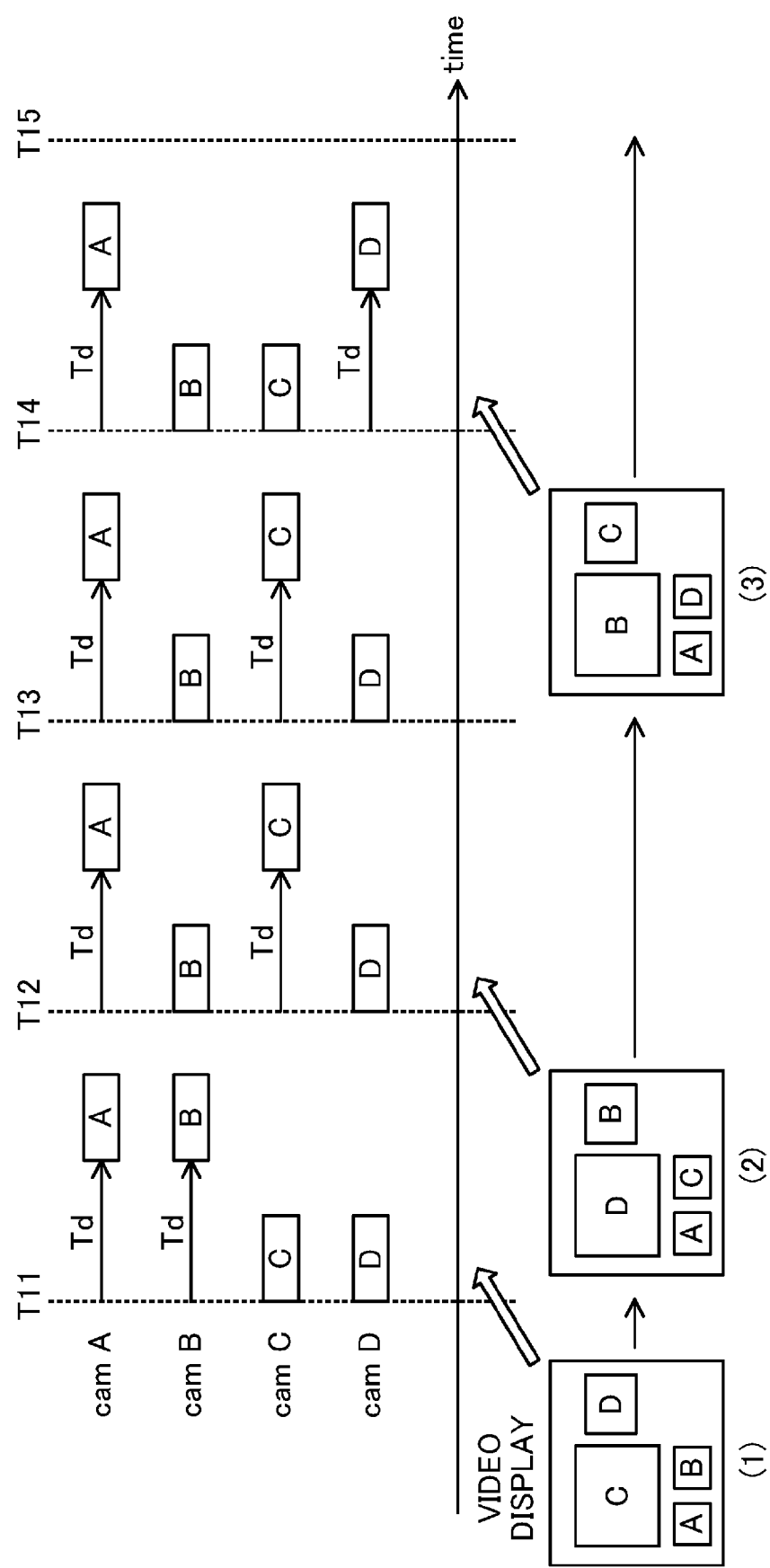
FIG. 5 is a timing chart schematically showing operation of the camera system in accordance with user operation in the first embodiment.

FIG. 5 is a timing chart schematically showing a change in operation of the camera system in accordance with user operation. In FIG. 5, T11-T15 denote times of receiving reference signals. The lower part of FIG. 5 shows the state of the screen of the image display section 170. In actual operation, the transmission cycle of video signals is much shorter than that in switching the screen of the image display section 170. FIG. 5, however, schematically illustrates this transmission cycle.

In state (1), the image of the camera C is selected as a main image and the image of camera D is selected as a switching candidate image, by user operation. At this time, the images of the cameras C and D are determined as priority images. Thus, at time T11, the cameras A and B notified that images being captured are not priority images delay transmission of video signals.

Thereafter, suppose the user switches the main image to the image of the camera D and the switching candidate to the image of the camera B (state (2)). At this time, the images of the cameras B and D are determined as priority images. Thus, at time T12, the cameras A and C notified that image being captured are not priority images delay transmission of video signals. This operation continues until the user next switches images.

Then, suppose the user switches the main image to the image of the camera B and the switching candidate to the image of the camera C (state (3)). Then, images of the cameras B and C are determined as priority images. Thus, at time T14, the cameras A and D notified that images being captured are not priority images delay transmission of video signals. This operation continues until the user next switches images.

In this manner, in this embodiment, priority images for transmitting video signals with priority dynamically change in accordance with operation by the user, and selection of cameras for delaying transmission of video signals also dynamically changes accordingly. Thus, quality degradation of an important image caused by network congestion can be avoided.

[1-3. Advantages etc.]

As described above, the camera system of this embodiment includes the camera devices 10 and the switching device 100. The switching device 100 transmits a reference signal for synchronizing video signals to the camera devices 10 and receives video signals from the camera devices 10, via the network. Each of the camera devices 10 transmits a video signal based on the time when the reference signal is received. The switching device 100 determines priority images for transmitting video signals with priority, among images captured by the camera devices 10. The switching device 100 notifies each of the camera devices 10 whether an image being captured is a priority image or not. When being notified that an image being captured is not a priority image, each of the camera devices 10 sets a period from reception of the reference signal to start of transmission of a video signal longer than that when being notified that an image being captured is a priority image. That is, the camera system is configured to delay the time of transmission of video signals from the camera devices 10 not capturing priority images relative to the time of transmission of video signals from the camera devices 10 capturing priority images.

In this manner, video signals from the camera devices 10 capturing priority images are transmitted before video signals from the camera devices 10 not capturing priority images. Thus, even if the network bandwidth is not sufficient for video signal transmission, the possibility of transmitting video signals of priority images without fail increases, whereas the possibility of occurrence of image disturbance decreases. As a result, quality degradation of a necessary image can be reduced.

In this embodiment, the switching device 100 may transmit a signal indicating the predetermined time Td, i.e., a waiting time from reception of a reference signal to start of transmission of a video signal, to the camera devices 10 that are not capturing priority images. For example, this signal may be included in a selection signal to be transmitted from the switching device 100 to the camera devices 10.

(Second Embodiment)

A second embodiment will be described with reference to FIGS. 6-8.

[2-1. Configuration]

Figure 6:
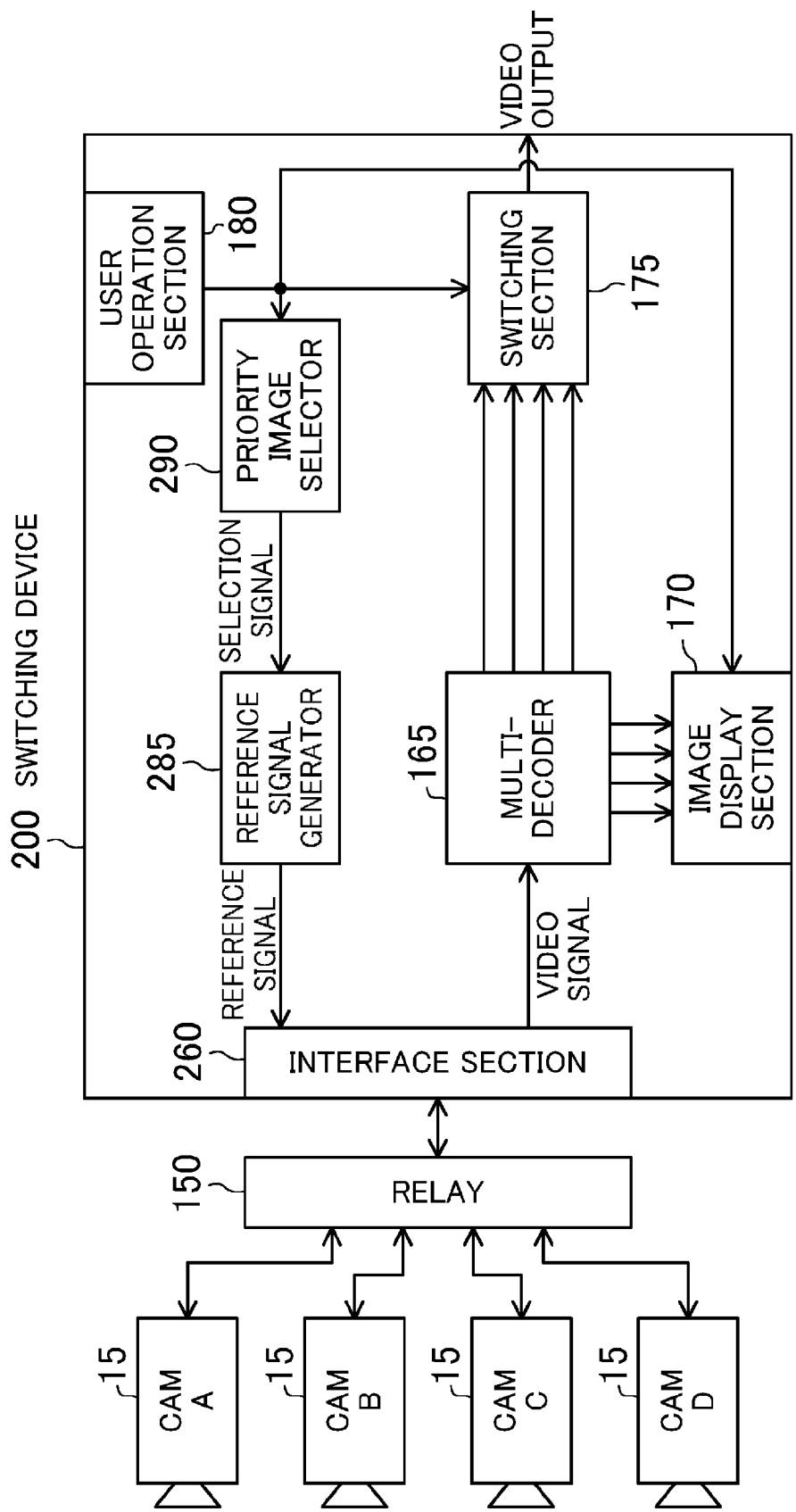
FIG. 6 is a block diagram illustrating a configuration of a camera system according to a second embodiment.

FIG. 6 is a block diagram schematically illustrating a configuration of a camera system according to the second embodiment. In FIG. 6, components substantially identical to those illustrated in FIG. 1 may not be described. The camera system illustrated in FIG. 6 includes a plurality of camera devices 15 (a cameras A, a camera B, a camera C, and a camera D), a relay 150, and a switching device 200. The camera devices 15 are cameras connectable to a network, i.e., network cameras, and are connected to the relay 150 via the network. The switching device 200 is connected to the relay 150 via the network. In this embodiment, the network is an Ethernet (registered trademark).

The camera devices 15 packetize captured video signals into packets, and output the packets to the network. The image data may be data subjected to compression coding or uncompressed data. The relay 150 is a network device such as a switching hub, and a network can be constituted by connecting a plurality of network devices. A video signal from each of the camera devices 15 is transmitted to the switching device 200 from the relay 150 via the network.

The switching device 200 includes an interface section 260, a multi-decoder 165, an image display section 170, a switching section 175, a user operation section 180, a reference signal generator 285, and a priority image selector 290.

In the first embodiment, the switching device 100 notifies each of the camera devices 10 whether an image being captured is a priority image or not. In addition, each of the camera devices 10 changes the time of outputting a video signal depending on whether an image being captured is a priority image or not. On the other hand, in the second embodiment, the switching device 200 does not notify the camera devices 15 whether images being captured are priority images or not. That is, a selection signal used in the first embodiment is not transmitted to the camera devices 15. Alternatively, the switching device 200 controls the time of transmitting a reference signal to each of the camera devices 15, depending on whether an image being captured is a priority image or not.

In the configuration of FIG. 6, in response to an output of the user operation section 180, the priority image selector 290 generates a selection signal for specifying one or more of the camera devices 15 that are capturing priority images. The selection signal is sent to the reference signal generator 285. Similarly to the first embodiment, the priority image selector 290 of the second embodiment determines a main image and a switching candidate image as priority images. For example, in the example of FIG. 2, images being captured by the cameras C and D are determined as priority images.

Similarly to the reference signal generator 185 of FIG. 1, the reference signal generator 285 periodically generates a reference signal serving as a basis of the time of transmitting a video signal. In this embodiment, the reference signal generator 285 receives a selection signal output from the priority image selector 290. Based on this selection signal, the reference signal generator 285 can distinguish the camera devices 15 capturing priority images and the camera devices 15 not capturing priority images from each other.

The reference signal generator 285 transmits a normal reference signal to the camera devices 15 capturing priority images (e.g., the cameras C and D in FIG. 2). On the other hand, the reference signal generator 285 transmits a reference signal delayed by a predetermined time Td to the camera devices 15 not capturing priority images (e.g., cameras A and B in FIG. 2). These reference signals are transferred to the interface section 260, and then to the camera devices 15 via the network.

The predetermined time Td may be a fixed value such as ½ or ⅓ of the period of a reference signal. The switching device 200 may adjust the value of the predetermined time Td in accordance with a network bandwidth, the number of cameras, or a parameter such as an image bit rate. Alternatively, the switching device 200 may be configured such that the predetermined time Td can be adjusted by user operation. In this case, the switching device 200 may be configured such that the user can finely adjust the predetermined time Td by using the user operation section 180 while checking the image quality. In addition, the predetermined time Td does not need to be the same among the camera devices 15, and may differ from one another among the camera devices 15.

[2-2. Operation]

Figure 7:
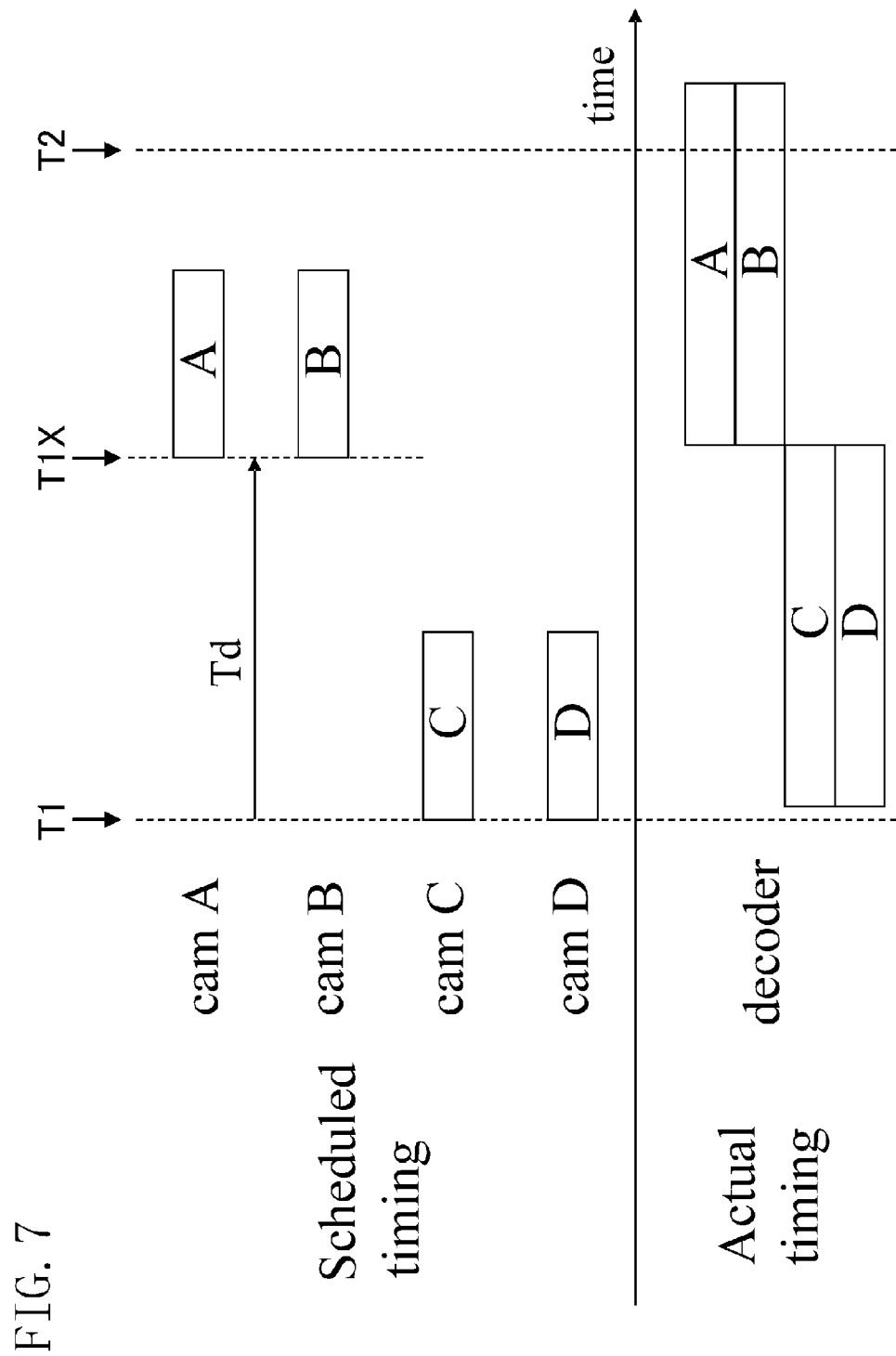
FIG. 7 is a timing chart showing an example of operation of the camera system of the second embodiment.

FIG. 7 is a timing chart showing an example of operation of the camera system of the second embodiment. The example of FIG. 7 is based on the assumption that the camera C is capturing a main image, the camera D is capturing a switching candidate image, and images being captured by the cameras C and D are determined as priority images. In addition, it is assumed that the reference signal generator 285 delays a reference signal by a predetermined time Td to the camera devices 15 that are not capturing priority images. In FIG. 7, T1 and T2 denote times of receiving reference signals, and T1X denotes a time of receiving a delayed reference signal. In FIG. 7, the upper part ("Scheduled timing") shows a scheduled timing necessary for transmitting video signals, and the lower part ("Actual timing") shows the time elapsed for actual transmission.

Each of the cameras A-D needs to output a predetermined unit of video signals to the network and transmit the predetermined unit to a receiver device, within a period from time T1 of receiving a reference signal to time T2 of receiving a next reference signal. Here, in a case where the network bandwidth is sufficiently large for the sum of the image bit rates of the cameras A-D, no significant problems occur even when the cameras A-D transmit video signals at the same time.

On the other hand, in a case where the network bandwidth is insufficient for the sum of the image bit rates of the cameras A-D, if the cameras A-D try to output video signals to the network at the same time, a large number of packets are transmitted at the same time, and consequently, a collision or a loss of the packets readily occurs. As a result, packets need to be transferred again, and a large delay occurs in transmission of video signals. Insufficiency of the network bandwidth arises when a high-quality camera having a high image bit rate is used, when a larger number of cameras are connected, or when the network bandwidth is originally small, and so on.

To cope with this insufficiency, as illustrated in FIG. 7, a reference signal delayed by the predetermined time Td is transmitted from the switching device 200 to the cameras A and B not capturing priority images. That is, video signals only of the cameras C and D capturing priority images are output to the network based on time T1 of receiving the reference signal.

In this manner, as illustrated in FIG. 7, the video signals of the cameras C and D are transmitted to a receiver device within a period before time T2. Thus, no image disturbance occurs in the main image and the switching candidate image. On the other hand, transmission of video signals of the cameras A and B is delayed by the predetermined time Td, and thus, transmission is not completed before time T2 of receiving the next reference signal in some cases, as illustrated in FIG. 7. In this case, although image disturbance occurs, the image disturbance has a small influence because the images of the cameras A and B are standby images. As a result, it is possible to avoid the problem that transmission of a priority image, i.e., an important video signal, is not completed within a predetermined period because of a network delay due to, for example, a packet collision.

Figure 8:
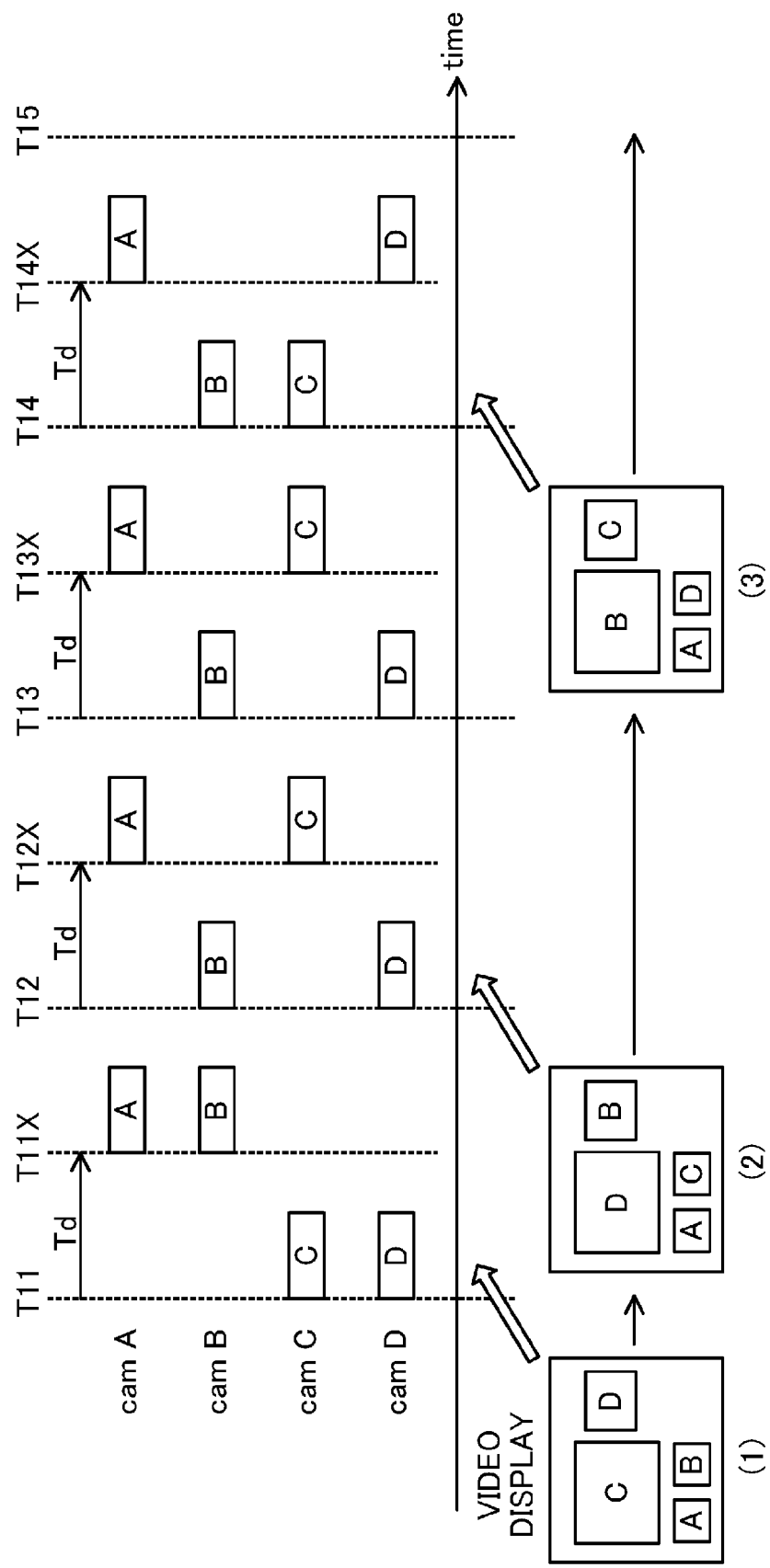
FIG. 8 is a timing chart showing an example of operation of the camera system in accordance with user operation in the second embodiment.

FIG. 8 is a timing chart schematically showing an example of operation of the camera system in accordance with user operation. In FIG. 8, T11-T15 denote times of receiving reference signals, and T11X-T14X denote times of receiving delayed reference signals. The lower part of FIG. 8 shows a state of the screen of the image display section 170. In actual operation, the transmission cycle of video signals is much shorter than that in switching the screen of the image display section 170. FIG. 8, however, schematically illustrates this transmission cycle.

In state (1), the image of the camera C is selected as a main image and the image of camera D is selected as a switching candidate image, by user operation. At this time, the images of the cameras C and D are determined as priority images. Thus, at time T11X, a reference signal delayed relative to normal time T11 is transmitted to the cameras A and B not capturing priority images.

Thereafter, suppose the user switches the main image to the image of the camera D and the switching candidate to the image of the camera B (state (2)). At this time, the images of the cameras B and D are determined as priority images. Thus, at time T12X, the cameras A and C not capturing priority images receive a reference signal delayed relative to normal time T12. This operation continues until the user next switches images.

Thereafter, suppose the user switches the main image to the image of the camera B and the switching candidate to the image of the camera C (state (3)). Then, images of the cameras B and C are determined as priority images. Thus, at time T14X, the cameras A and D not capturing priority images receive a reference signal delayed relative to normal time T14. This operation continues until the user next switches images.

In this manner, similarly to the first embodiment, priority images for transmitting video signals with priority dynamically change in accordance with operation by the user, and selection of cameras for delaying transmission of video signals also dynamically changes accordingly in this embodiment. Thus, quality degradation of an important image due to network congestion can be avoided.

In this embodiment, it is sufficient for the camera devices 15 to operate similarly to conventional camera devices, i.e., transmit video signals after receiving reference signals. Thus, in this embodiment, the configuration of the camera devices 15 does not need to be changed, and an existing camera device can be used.

[2-3. Advantages etc.]

As described above, the camera system of this embodiment includes the camera devices 15 and the switching device 200. The switching device 200 transmits a reference signal for synchronizing video signals to the camera devices 15 and receives video signals from the camera devices 15, via the network. Each of the camera devices 15 transmits a video signal based on the time when the reference signal is received. The switching device 200 determines priority images for transmitting video signals with priority, among images captured by the camera devices 15. The switching device 200 delays the time of transmitting a reference signal to the camera devices 15 not capturing priority images, relative to the camera devices 15 capturing priority images. That is, the camera system is configured to delay the time of transmission of video signals from the camera devices 15 not capturing priority images relative to the time of transmission of video signals from the camera devices 15 capturing priority images.

In this manner, video signals from the camera devices 15 capturing priority images are transmitted before video signals from the camera devices 15 not capturing priority images. Thus, even if the network bandwidth is not sufficient for video signal transmission, the possibility of transmitting video signals of priority images without fail increases, whereas the possibility of occurrence of image disturbance decreases. As a result, quality degradation of a necessary image can be reduced.

(Other Embodiments)

The foregoing first and second embodiments have been described as example techniques disclosed in the present application. However, the techniques according to the present disclosure are not limited to these embodiments, and are also applicable to those where modifications, substitutions, additions, and omissions are made. In addition, elements described in the first and second embodiments may be combined to provide a different embodiment.

Other embodiments will now be described.

Figure 9:
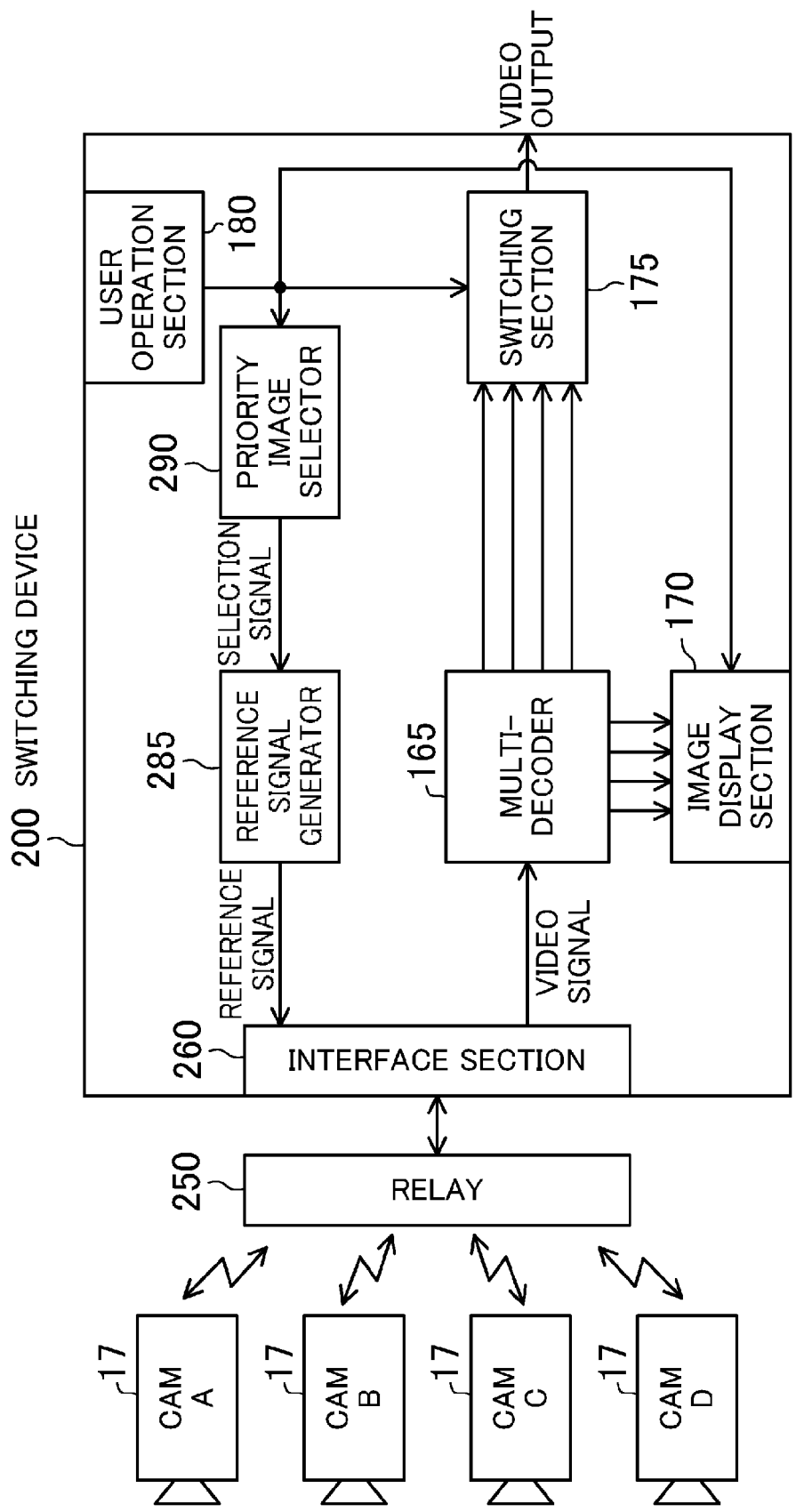
FIG. 9 is a block diagram illustrating a configuration of a camera system according to a variation of the embodiment.

In the first and second embodiments, the camera devices are connected to the switching device via a wired network. However, the present disclosure is not limited to this configuration, and a wireless network as illustrated in FIG. 9 may be used. In FIG. 9, camera devices 17 are connected to a relay 250 via a wireless network. The relay 250 may be wireless network equipment such as an access point of a wireless network. The configuration FIG. 9 corresponds to the second embodiment, but the configuration of the first embodiment may employ a wireless network.

In the first embodiment, the relay 150 and the switching device 100 may be united together as one device. In the second embodiment, the relay 150 and the switching device 200 may be united together as one device. The image display section 170 and the user operation section 180 may be united with the switching devices 100 and 200, or may be separate from the switching devices 100 and 200 and connected to the switching devices 100 and 200 via signal lines.

In the first and second embodiments, the main image and the switching candidate image are determined as priority images. However, the present disclosure is not limited to this. For example, only the main image may be determined as a priority image. Alternatively, a plurality of switching candidate images may be included in priority images. The user may determine a priority image for transmitting a video signal with priority, independently of selection of the main image and the switching candidate image.

In the first and second embodiments, main images and the switching candidate image output from the switching devices 100 and 200 are determined as priority images. However, determination of priority images is not limited to this. For example, the user may determine an image with which the camera angle is adjusted as a priority image. Some camera systems are configured to allow a switching device or a camera operating section near the switching device to adjust the angle (e.g., pan and tilt) of a remote camera. In adjusting the angle with such a configuration, image quality degradation of the camera undesirably hinders the adjustment. In view of this, when the user selects an adjustment target image with which the camera angle is adjusted, the adjustment target image may be determined as a priority image.

Figure 10:
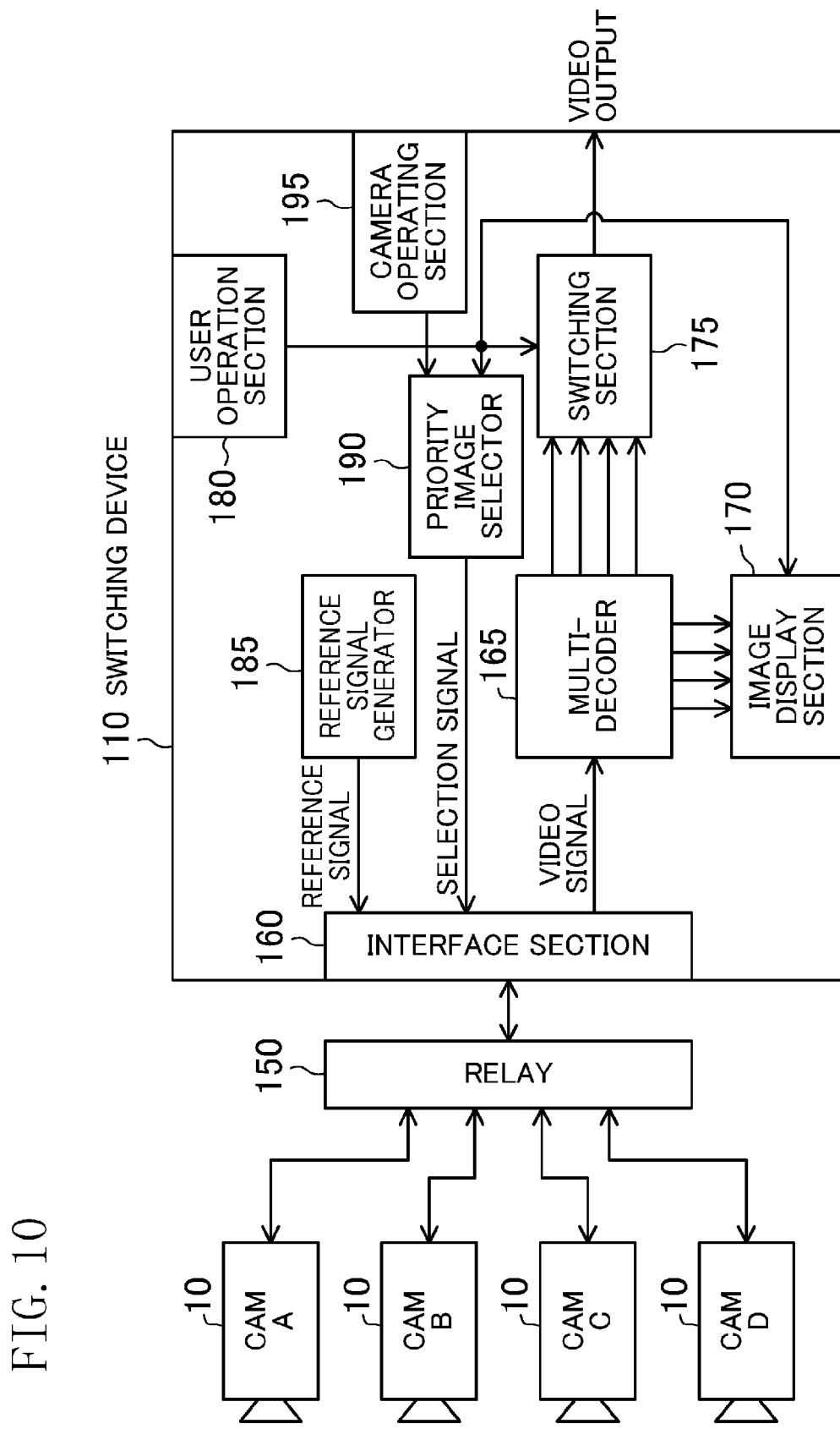
FIG. 10 is a block diagram illustrating a configuration of a camera system according to a variation of the embodiment.

FIG. 10 is a block diagram schematically illustrating a configuration of a camera system according to a variation of the first embodiment. In FIG. 10, a switching device 110 includes a camera operating section 195 for remotely operating a camera. The camera operating section 195 may be separate from a switching device 110, and may be connected to the switching device 110 via a signal line. The priority image selector 190 receives an operation output from the camera operating section 195. When the user adjusts the angle of a remote camera by operating the camera operating section 195, the priority image selector 190 determines, as a priority image, an image of the camera whose angle is being adjusted. The subsequent operation is similar to that in the first embodiment. A similar variation is also applicable to the second embodiment.

In the first embodiment, the switching device 100 notifies the camera devices 10 whether images being captured are priority images or not, and transmission of video signals of the camera devices 10 not capturing priority images is delayed. In the second embodiment, the switching device 150 delays transmission of a reference signal to the camera devices 15 not capturing priority images. The present disclosure is not limited to these embodiments. Specifically, the camera system may have a configuration in which the switching device determines priority images in accordance with operation by the user and the camera system delays the time of transmission of video signals from camera devices not capturing priority image relative to the time of transmission of video signals from camera devices capturing priority images.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to camera systems that reduce quality degradation of necessary images. Specifically, the present disclosure is useful for, for example, camera systems for broadcasting or recording sports or live concerts.

What is claimed is:

1. A camera system comprising:
    a plurality of camera devices connectable to a network, the plurality of camera devices generating respective video signals; and
    a switching device configured to transmit a reference signal for synchronizing the generated video signals to the camera devices via the network and receive the generated video signals from the camera devices, wherein each of the camera devices transmits the generated video signal based on when the camera device receives the reference signal, the switching device determines, in accordance with operation by a user and in order to transmit video signals with priority, one or more priority images among a plurality of images captured by the camera devices, the plurality of images being displayed on a screen of an image display, and the camera system has a configuration whereby a time, at which a video signal from each of one or more of the camera devices not capturing the one or more priority images is transmitted, is delayed relative to a time at which a video signal from each of one or more of the camera devices capturing the one or more priority images is transmitted.

2. The camera system of claim 1, wherein the switching device notifies the camera devices whether images that are being captured by the camera devices are the one or more priority images or not, and in each of the camera devices, when the camera device is notified that an image being captured by the camera device is not the one or more priority images, a period from reception of the reference signal to start of transmission of a video signal is set longer than that when the camera device is notified that the image being captured by the camera device is the one or more priority images.

3. The camera system of claim 2, wherein the switching device transmits a signal indicating a waiting time from reception of the reference signal to start of transmission of a generated video signal, to one or more of the camera devices not capturing the one or more priority images.

4. The camera system of claim 1, wherein the switching device delays transmission of the reference signal to each of one or more of the camera devices not capturing the one or more priority images, relative to transmission of the reference signal to each of one or more of the camera devices capturing the one or more priority images.

5. The camera system of claim 1, wherein the switching device is configured to select, in accordance with operation by the user, a main image to be output to outside and a switching candidate image as a candidate to be switched to a main image, from the plurality of images captured by the camera devices, and the switching device determines the main image and the switching candidate image as the one or more priority images.

6. The camera system of claim 1, wherein the switching device is configured to select, in accordance with operation by the user, an adjustment target image with which a camera angle is to be adjusted from the plurality of images captured by the camera devices, and the switching device determines the adjustment target image as the one or more priority images.

7. The camera system of claim 1, wherein the switching device is configured to adjust a predetermined delay time with which transmission of a video signal from each of one or more of the camera devices not capturing the one or more priority images is delayed, in accordance with operation by the user.

8. A switching device for use in a camera system, the switching device being configured to transmit, via a network, a reference signal for synchronizing generated video signals to a plurality of camera devices connected to the network, and receive the generated video signals from the camera devices, wherein each of the camera devices transmits the generated video signal based on when the camera device receives the reference signal, the switching device determines, in accordance with operation by a user and in order to transmit video signals with priority, one or more priority images among a plurality of images captured by the camera devices, the plurality of images being displayed on a screen of an image display, and the switching device notifies the camera devices whether images that are being captured by the camera devices are or are not the one or more priority images.

9. A switching device for use in a camera system, the switching device being configured to transmit, via a network, a reference signal for synchronizing generated video signals to a plurality of camera devices connected to the network, and receive the generated video signals from the camera devices, wherein each of the camera devices transmits the generated video signal based on when the camera device receives the reference signal, the switching device determines, in accordance with operation by a user and in order to transmit video signals with priority, one or more priority images among a plurality of images captured by the camera devices, the plurality of images being displayed on a screen of an image display, and the switching device delays transmission of the reference signal to each of one or more of the camera devices not capturing the one or more priority images, relative to transmission of the reference signal to each of one or more of the camera devices capturing the one or more priority images.

* * * * *